(12) United States Patent
Kratzke

(10) Patent No.: US 11,880,045 B2
(45) Date of Patent: Jan. 23, 2024

(54) MOTION GENERATOR

(71) Applicant: Paul Kratzke, Wittenberg, WI (US)

(72) Inventor: Paul Kratzke, Wittenberg, WI (US)

( * ) Notice: Subject to any disclaimer, the term of this patent is extended or adjusted under 35 U.S.C. 154(b) by 329 days.

(21) Appl. No.: 17/492,259

(22) Filed: Oct. 1, 2021

(65) Prior Publication Data

US 2022/0107505 A1 Apr. 7, 2022

Related U.S. Application Data

(60) Provisional application No. 63/087,026, filed on Oct. 2, 2020.

(51) Int. Cl.
*G02B 27/20* (2006.01)

(52) U.S. Cl.
CPC .................... *G02B 27/20* (2013.01)

(58) Field of Classification Search
CPC ..................................... G02B 27/20
See application file for complete search history.

(56) References Cited

U.S. PATENT DOCUMENTS

| | | | |
|---|---|---|---|
| 1,497,476 | A | 6/1924 | Binnie |
| 2,909,082 | A | 10/1959 | Booth |
| 3,660,704 | A | 5/1972 | Paine et al. |
| 4,622,751 | A | 11/1986 | Berg |
| 5,374,804 | A | 12/1994 | Uchino et al. |
| 6,126,381 | A | 10/2000 | Bacchi et al. |
| 8,663,264 | B2 | 3/2014 | Cesarini et al. |
| 10,220,469 | B2 | 3/2019 | Yamashita et al. |
| 2005/0029459 | A1* | 2/2005 | Gotz .................. G01B 11/0658 250/353 |
| 2016/0178918 | A1* | 6/2016 | Tang ...................... G02B 27/20 353/42 |
| 2017/0281273 | A1* | 10/2017 | Karni ................... A61B 18/201 |

FOREIGN PATENT DOCUMENTS

| | | |
|---|---|---|
| DE | 102009050638 B4 | 4/2011 |
| DE | 102013224207 A1 | 5/2015 |
| EP | 1666189 A1 | 6/2006 |

OTHER PUBLICATIONS

Collins, "What are the benefits of a rotating ball nut (aka driven nut)?", <https://www.linearmotiontips.com/what-are-the-benefits-of-a-rotating-ball-nut-aka-driven-nut/>, 2018, 11 pages.
Greg Reale, "SolidWorks Drill Press Animation", YouTube video, <https://www.youtube.com/watch=ZzWmvzil9mQ>, 2010, 3 pages.

* cited by examiner

*Primary Examiner* — Kevin Quarterman
(74) *Attorney, Agent, or Firm* — Michael Best & Friedrich LLP

(57) ABSTRACT

A motion generator including a frame, a mount movable with respect to the frame, and an emitting device having a beam outlet configured to emit an electromagnetic beam therefrom, and where the emitting device is coupled to and movable together with the mount relative to the frame. The motion generator is also operable in a first mode in which the beam outlet travels in a spiral pattern that alternatingly increases and decreases in radius, where for any given point in the spiral pattern the beam outlet produces a beam speed, a beam direction, an instantaneous beam radius, and a beam radius rate of change, and where the beam speed, the beam direction, and the beam radius rate of change may be adjusted independently.

20 Claims, 6 Drawing Sheets

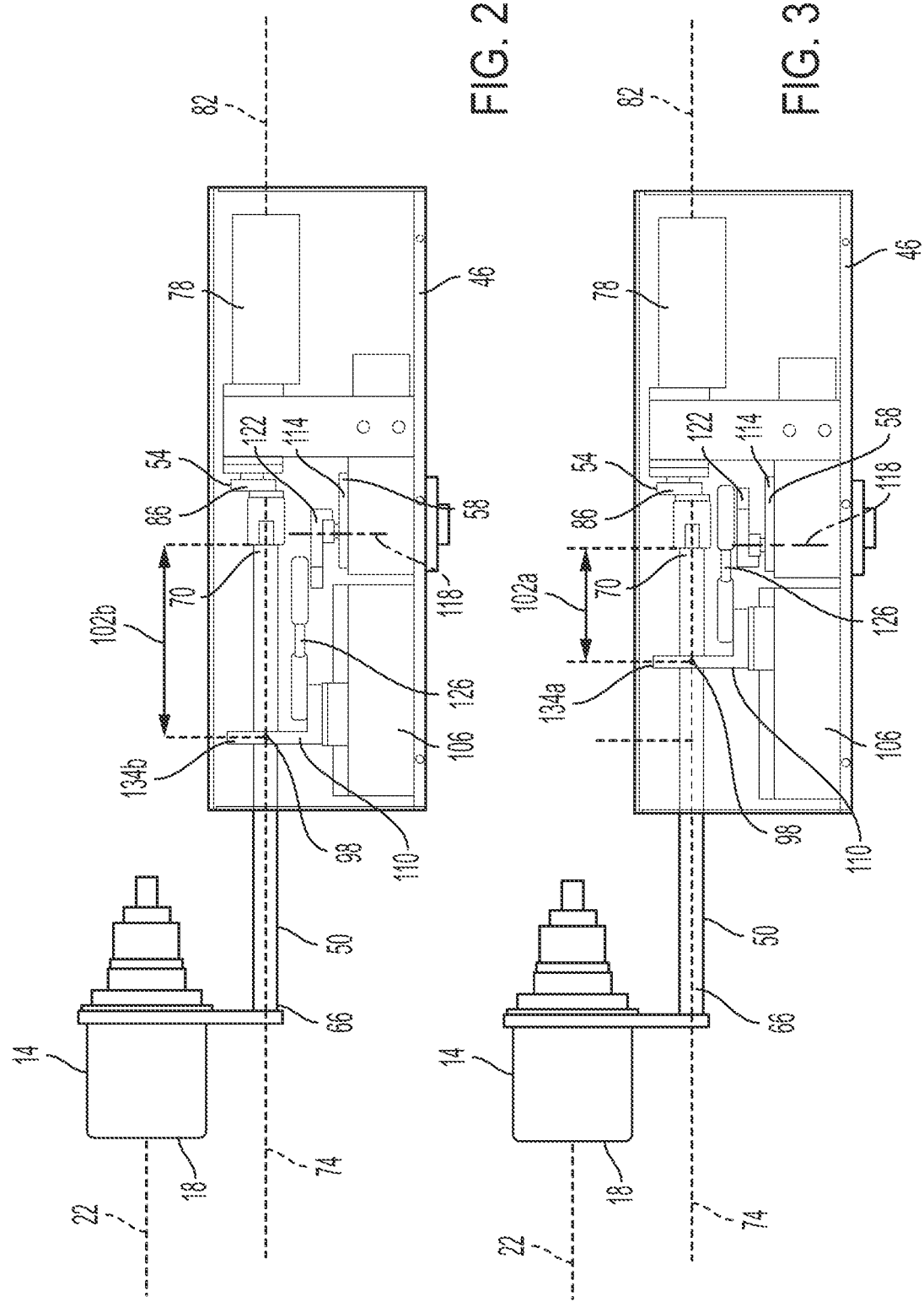

MOTION GENERATOR

RELATED APPLICATIONS

The present application is a formalization of U.S. Provisional Patent Application No. 63/087,026 filed Oct. 2, 2020. The entire contents of which are hereby incorporated by reference.

FIELD

The disclosure relates to a motion generator.

BACKGROUND

During some medical and/or therapeutic treatments, a laser or other electromagnetic beam may be directed onto a patient's skin or other tissue.

SUMMARY

In one embodiment, a motion generator including a frame, a mount movable with respect to the frame, and an emitting device having a beam outlet configured to emit an electromagnetic beam therefrom, and where the emitting device is coupled to and movable together with the mount relative to the frame. The motion generator is also operable in a first mode in which the beam outlet travels in a spiral pattern that alternatingly increases and decreases in radius, where for any given point in the spiral pattern the beam outlet produces a beam speed, a beam direction, an instantaneous beam radius, and a beam radius rate of change, and where the beam speed, the beam direction, and the beam radius rate of change may be adjusted independently.

In another embodiment, a motion generator including a frame, a mount movable with respect to the frame, the mount having a first end, a second end opposite the first end, and defining a mount axis extending through the first end and the second end, an emitting device having a beam outlet configured to emit an electromagnetic beam therefrom, and where the emitting device is coupled to and movable together with the first end of the mount, a first input including a first input arm configured to rotate about a first input axis, where the first input arm includes a first mounting point offset from the first input axis, and where the second end of the mount is coupled to the first mounting point of the first input arm, and a second input including a pivot support configured to establish a pivot point about which the mount pivots during use, where the pivot point defines a pivot point length relative to the second end of the mount, and where the pivot support is movable along the mount axis to change the pivot point length.

BRIEF DESCRIPTION OF THE DRAWINGS

FIGS. 2 and 3 are side views of the motion generator of FIG. 1.

DETAILED DESCRIPTION

Figure 1:
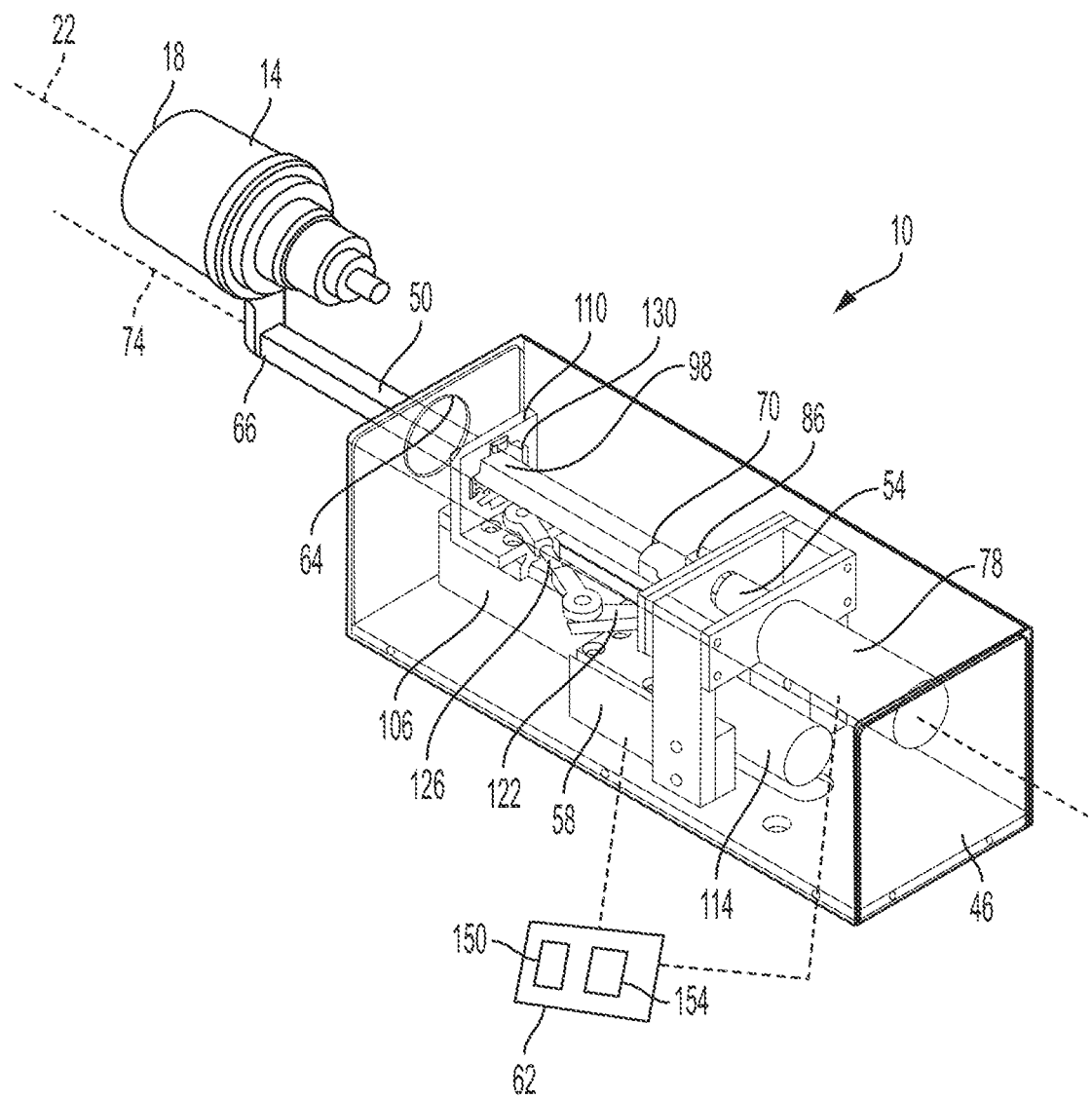
FIG. 1 is a perspective view of a motion generator.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

FIGS. 1-4 illustrate a motion generator 10 for use with an emitting device 14 having a beam outlet 18 configured to emit an electromagnetic beam 22 therefrom, such as a laser and the like. The motion generator 10 is configured to manipulate and move the emitting device 14 so that the beam outlet 18 and resulting beam 22 travels in a repeating and adjustable pattern. More specifically, the motion generator 10 is configured to manipulate the emitting device 14 so that, in a first operating mode, the beam outlet 18 (e.g., the location where the beam 22 exits the emitter 14) and beam 22 produces a "spiral" pattern that alternatingly increases (FIG. 5) and decreases (FIG. 6) in radius. The motion generator 10 is also configured, in a second operating mode, to manipulate the emitting device 14 so that the beam outlet 18 and beam 22 produces a "circle" pattern.

Figure 5:
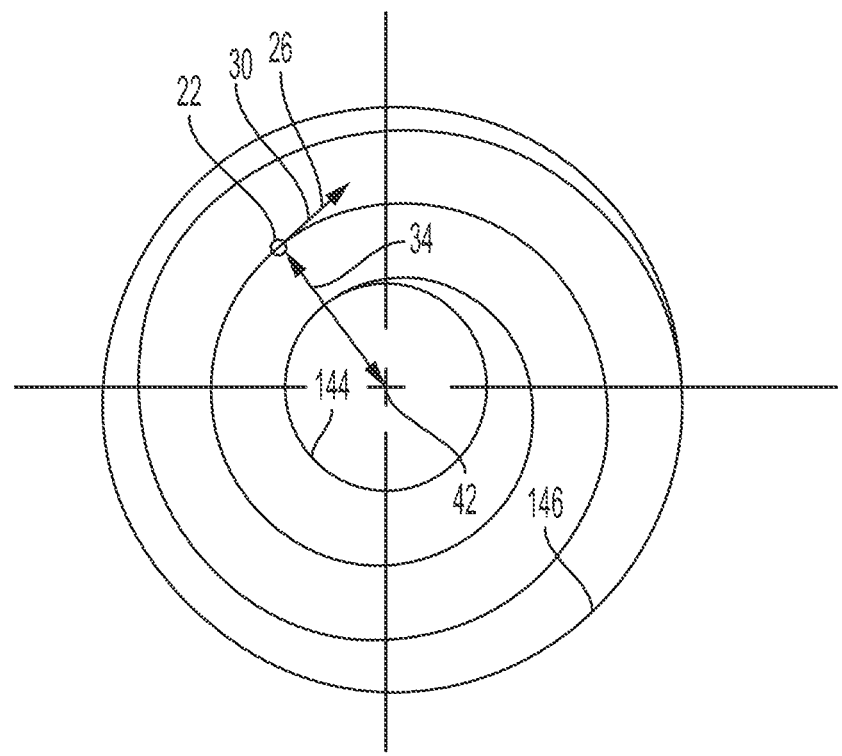
FIG. 5 is a schematic view of an increasing spiral pattern.

For any given point in the spiral or circle pattern, the beam outlet 18 produces a beam speed 26, a beam direction 30, and an instantaneous beam radius 34. When producing the spiral pattern, the beam outlet 18 also defines a beam radius rate of change 38 (see FIG. 7), generally defined at the rate at which the beam radius 34 increases and/or decreases in magnitude. As shown in FIGS. 5 and 1, the beam radius 34 is measured from the pattern center 42 (e.g., the spiral center or circle center). The motion generator 10 is configured such that the beam speed 26, beam direction 30, instantaneous beam radius 34, and radius rate of change 38 are all independently adjustable.

The motion generator 10 includes a frame 46, a mount 50 movable with respect to the frame 46 and configured to support the emitting device 14 thereon, a first or rotational input 54, a second or radial input 58, and a controller 62.

As shown in FIG. 1, the frame 46 of the motion generator 10 generally includes a box or other enclosed structure at least partially encompassing the first input 54, the second input 58, and the mount 50. In the illustrate embodiment, the frame 46 defines an aperture 64 through which the mount 50 extends so that the emitting device 14 is positioned outside the frame 46. However, in alternative embodiments, the entire mount 50 and emitter 14 may be positioned within the frame 46.

The mount 50 of the motion generator 10 is supported and maneuvered relative to the frame 46 by the first and second inputs 54, 58 while, in turn, rigidly supports the emitting device 14 thereon. In the illustrated embodiment, the mount 50 is substantially elongated in shape having a first end 66, a second end 70 opposite the first end 66, and defining an axis 74 therethrough. When assembled, the emitting device 14 is fixedly mounted to the mount 50 such that the device 14 and mount 50 move together as a single unit. The device 14 is also mounted proximate the first end 66 so that the beam 22 emitted from the device 14 is oriented substantially parallel with the axis 74 (see FIGS. 2 and 3).

Figure 4:
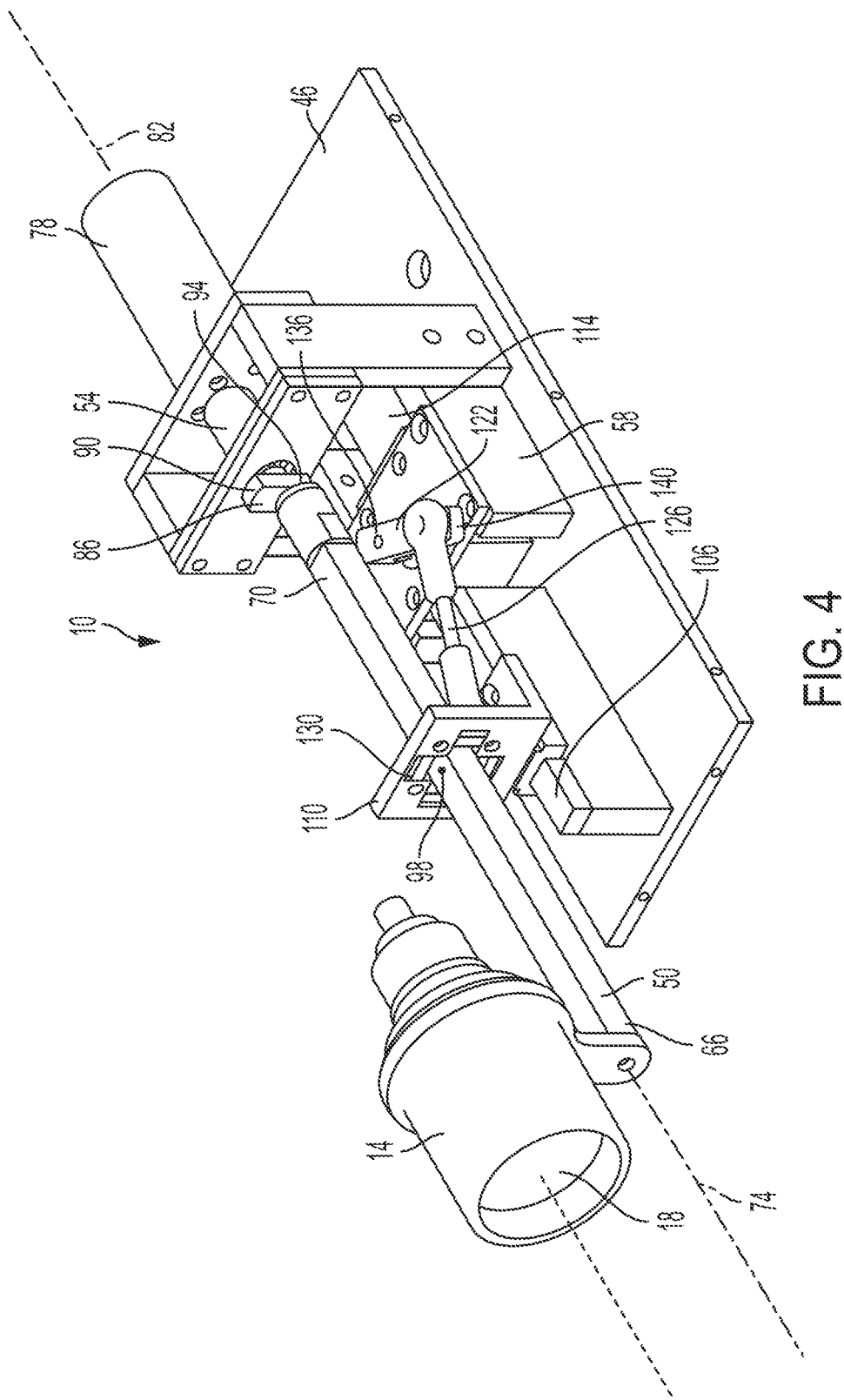
FIG. 4 is a perspective view of the motion generator of FIG. 1 with a portion of the frame removed.

The first or rotational input 54 of the motion generator 10 is configured to impart motion onto the mount 50 relative to the frame 46. More specifically, the first input 54 is generally configured to dictate the beam speed 26 and the beam direction 30. As shown in FIG. 4, the first input 54 includes a first input motor 78 defining a first input axis 82, and a first input arm 86 coupled to the motor 78 for rotation about the first input axis 82. More specifically, the first input arm 86 includes a first end 90 coupled to the motor 78 and a second end 94 opposite the first end 90 that is coupled to the second end 70 of the mount 50. During use, the operation of the first input motor 78 causes the second end 94 of the first input arm 86 to rotate about the first input axis 82 in a circular path centered on the first input axis 82. As such, adjusting speed and direction of rotation of the motor 78 dictates the speed and direction at which the second end 94 of the mount 50 travels in the circular path.

The second or radial input 58 of the motion generator 10 is configured to establish a pivot point 98 about which the mount 50 pivots during operation and adjust the position of the pivot point 98 along the length of the mount 50 to change the pivot point length 102. For the purpose of this application, the pivot point length 102 is generally defined as the axial distance between the pivot point 98 and the second end 70 of the mount 50. In the illustrated embodiment, the second input 58 includes a track 106 fixed relative to the frame 46, a pivot support 110 configured to establish the pivot point 98 and movable along the track 106, a second input motor 114 defining a second input axis 118, a second input arm 122 coupled to and driven by the second input motor 114, and a connecting rod 126 extending between and connected to both the second input member 122 and the pivot support 110.

As shown in FIG. 4, the track 106 of the second input 58 is substantially elongated in shape and substantially aligned with the axis 74 of the mount 50 and first input axis 82. The illustrated track 106 is configured to laterally restrain the motion of the pivot support 110 while allowing the pivot support 110 to move longitudinally along the track 106 (e.g., limiting the motion of the pivot support 110 along the axis 74). In the illustrated embodiment, the track 106 consists of a single rail along which the pivot support 110 slides, however in alternative embodiments, bearings, interlocking members, and the like may be used to increase locking between the two elements while still allowing them to move longitudinally with respect to each other.

As shown in FIG. 4, the pivot support 110 of the second input 58 is configured to partially restrain the mount 50 to establish the pivot point 98 about which the mount 50 pivots during use. More specifically, the pivot support 110 defines an aperture 130 sized for the body of the mount 50 to pass therethrough and configured to restrict any lateral movement of the mount 50 (e.g., perpendicular to the axis 74) at that particular location. In the illustrated embodiment, the aperture 130 of the pivot support 110 includes a plurality of bearings to minimize friction and wear between the pivot support 110 and the mount 50. However, in alternative embodiments other forms of interface, such as bushings, wear plates, and the like may be used.

During use, the pivot support 110 is configured to travel along the track 106 causing the pivot support 110 and corresponding pivot point 98 to move axially along the length of the mount 50. More specifically, the pivot support 110 travels along the track 106 between a first pivot point location 134a producing a first pivot point length 102a (see FIG. 3), and a second pivot point location 134b producing a second pivot point length 102b that is greater than the first pivot point length 102a (see FIG. 2).

Moving the pivot support 110 along the axial length of the mount 50 changes the pivot point length 102 and causes the mechanical advantage produced by the mount 50 for a given input from the first input 54 to change. More specifically, shortening the pivot point length 102 (e.g., moving the pivot support 110 closer to the second end 70) increases the mechanical advantage produced by the mount 50 and results in a larger displacement of the first end 66 for a given input by the first input 54 at the second end 70. In contrast, lengthening the pivot point length 102 (e.g., moving the pivot support 110 further away from the second end 70) decreases the mechanical advantage produced by the mount 50 and results in a smaller displacement of the first end 66 for a given input by the first input 54 at the second end 70.

Since the first input 54 moves the second end 70 of the mount 50 in a circular pattern having a constant diameter (e.g., the length of the first input arm 86, discussed above), the pivot point length 102 ultimately establishes the instantaneous beam radius 34. Similarly, the first pivot point length 102a establishes the minimum pattern diameter 144 (e.g., the smallest diameter of the spiral pattern) while the second pivot point length 102b establishes the maximum pattern diameter 146 (e.g. the largest diameter of the spiral pattern). Although the illustrated spiral pattern is shown having a non-zero minimum pattern diameter 144, it is understood that in alternative embodiments a zero minimum pattern diameter 144 may be produced.

The second input arm 122 includes an elongated member having a first end 136 coupled to the second input motor 114 and a second end 140 opposite the first end 136 spaced a distance therefrom. During use, rotation of the second input motor 114 causes the second end 140 of the arm 122 to travel in a circle centered upon the second input axis 118. Although the illustrated arm 122 is fixed in length, in alternative embodiments, the length of the second input arm 122 may be adjustable—either automatically or manually.

The connecting rod 126 of the second input 58 is pivotably coupled to and extends between the pivot support 110 and the second end 140 of the second input arm 122. During use, the connecting rod 126 interconnects the second input arm 122 and pivot support 110 such that constant rotation of the second input motor 114 causes the pivot support 110 to reciprocate along the length of the track 106 between the first pivot point location 134a and the second pivot point location 134b. In the illustrated embodiment, the distance between the first and second pivot point locations 134a, 134b are determined by the length of the second input arm 122 (e.g., the distance between the first end 136 and the second end 140). As such, adjusting the length of the second input arm 122 alters the difference between the minimum pattern diameter 144 and the maximum pattern diameter 146.

It is understood that while the illustrated embodiment of the motion generator 10 includes two input motors 78, 114 each operable independently of each other, in alternative embodiments a single input motor (not shown) may be used to drive both the first input 54 and the second input 58. In such an embodiment, gearing or other transmission mechanisms may be provided may be provided to tie the rotation of the first input 54 relative to the second input 58. Furthermore, such transmission mechanisms may be adjustable so that the relative rotational speed of the first and second inputs 54, 58 may be adjusted.

Figure 8:
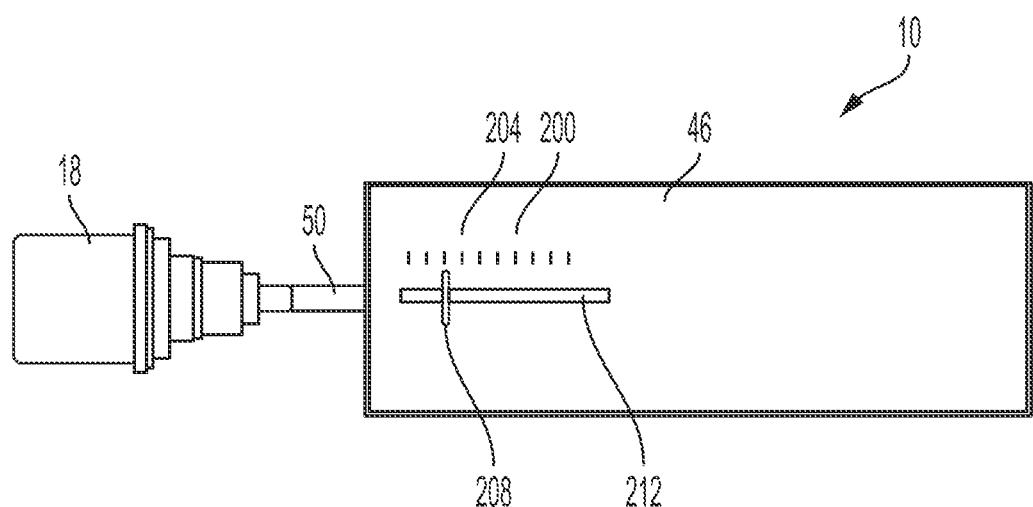
FIG. 8 illustrates the motion generator of FIG. 1 with a gauge installed thereon.

As shown in FIG. 8, the motion generator 10 may also include a radius gauge 200 for indicating to the user the instantaneous beam radius 34. The gauge 200 includes a scale 204 formed onto the frame 46 or a structure stationary with the frame 46, and an indicator 208 mounted to the pivot support 110 and movable together therewith. In the illustrated embodiment, the indicator 208 extends through a slot formed into the frame 46 so that it is visible by the user during operation. During use, the indicator 208 moves together with the pivot support 110 so that it travels along the scale 204 as the pivot support 110 moves along the axial length of the mount 50. As such, the scale 204 and indicator 208 can illustrate what the instantaneous beam radius 34 is at any given point in time.

The motion generator 10 also includes a controller 62 in operable communication with both the first input 54 and the second input 58. More specifically, the controller 62 includes a processor 150 and a memory unit 154 for storing and executing commands. In the illustrated embodiment, the controller 62 is configured to independently control the speeds and directions at which the first input motor 78 and the second input motor 114 rotate. More specifically, the controller 62 is configured to output commands to the first input motor 78 and the second input motor 114 to allow the motion generator 10 to operate in both a first operating mode, in which the beam outlet 18 and resulting beam 22 produce a reciprocating spiral shape, and a second operating mode, in which the beam outlet 18 and beam 22 produce a circular shape.

While operating in the first operating mode, the controller 62 is configured to output commands causing both the first input motor 78 and the second input motor 114 to rotate. More specifically, the controller 62 dictates the beam speed 26 and beam direction 30 by manipulating the speed and direction at which the first input motor 78 rotates and dictates the radius rate of change 38 by manipulating the speed at which the second input motor 114 rotates. More specifically, the controller 62 is configured to increase the rotational speed of the motor 78 to cause an increase in beam speed 26 or decrease the rotational speed of the motor 78 to cause a decrease in beam speed 26. The controller 62 is also configured to direct the motor 78 to rotate in a clockwise or counterclockwise direction causing the beam direction 30 to be in a clockwise or counterclockwise direction, respectively. The controller 62 is also configured to increase the rotational speed of the motor 114 to increase the radius rate of change 38 or decrease the rotational speed of the motor 114 to decrease the radius rate of change 38.

In some embodiments, the controller 62 may include user inputs allowing the user to input the desired pattern parameters (e.g., beam speed 26, beam direction 30, and radius rate of change 38) whereby the controller 62 will calculate the needed first and second input motor 78, 114 speeds and directions. Generally speaking, once the controller 62 determines the appropriate rotational speeds for the first and second input motors 78, 114, the input motors 78, 114 will continue to rotate constantly at the desired speed for the duration of the treatment or event until the user inputs new parameters into the motion generator 10. In other embodiments, the controller 62 may include user inputs (not shown) allowing the user to input the desired rotational speeds of the first and second input motors 78, 114, directly.

While operating in the second mode, the controller 62 is configured to output signals causing the first input motor 78 to rotate while the second input motor 114 remains stationary at a pre-determined rotational position. More specifically, the controller 62 is configured to orient the second input arm 122 via the second input motor 114 so that the pivot support 110 is positioned to produce the desired instantaneous beam radius 34. Since the second input motor 114 remains stationary during operation in the second mode, the instantaneous beam radius 34 remains constant—producing a circular path. With the radius 34 established by the first motor 114, the controller 62 dictates the beam speed 26 and the beam direction by manipulating the speed and direction of the rotation of the first input motor 78. Stated differently, the controller 62 is configured to increase the rotational speed of the motor 78 to cause an increase in beam speed 26 or decrease the rotational speed of the motor 78 to cause a decrease in beam speed 26.

In some embodiments, the controller 62 may include user inputs allowing the user to input the desired pattern parameters (e.g., beam speed 26, beam direction 30, and instantaneous radius 34) whereby the controller 62 will calculate the needed speed and direction for the first input motor 78 and the desired orientation of the second input motor 114. Generally speaking, once the controller 62 determines the appropriate rotational speed for the first input motor 78, the input motor 78 will continue to rotate constantly at the desired speed for the duration of the treatment or event until the user inputs new parameters into the motion generator 10. In other embodiments, the controller 62 may include user inputs (not shown) allowing the user to input the desired rotational speed of the first input motor 78, directly.

In still other embodiments, the controller 62 may allow the user to input an entire program (e.g., different pattern parameters for pre-determined lengths of time) and the controller 62 will produce the desired program automatically (e.g., change the motor 78, 114 outputs at the desired times). For example, the user may input that they want the motion generator 10 to operate in the first mode of operation at a first beam speed 26, first beam direction 30, and first radius rate of change 38 for a first period of time, then change to a second beam speed 26, second beam direction 30, or second radius rate of change 38 for a second period of time. The user may also input that the motion generator 10 change operating modes during the program.

In still other embodiments, the controller 62 may also be in operable communication with the emitting device 14. In such embodiments, the controller 62 may be configured to adjust the intensity of the beam 22 output by the device 14. In still other embodiments, the controller 62 may be configured to limit the maximum beam intensity based at least in part on the beam speed 26. In such embodiments, the controller 62 may be configured to increase the maximum allowable beam intensity proportional to the beam speed 26. For example, if the beam 22 travels at a first beam speed, the controller 62 would limit the beam 22 to a first intensity while if the beam 22 travels at a second beam speed greater than the first beam speed, the controller 62 would limit the beam 22 to a second intensity greater than the first intensity. Still further, the controller 62 may be configured to automatically turn off the beam 22 when the beam is stopped or drops below a pre-determined threshold. In still other embodiments, the controller 62 may be configured to alter the output of the beam 22 so that a pre-determined energy-per-unit of travel is achieved and maintained.

In still other embodiments, the controller 62 may also be configured to adjust the minimum and maximum pattern diameter 144, 146. More specifically, the controller 62 may be in operable communication with the second input arm 122 and configured to alter its length, thereby changing the difference between the minimum and maximum pattern diameters 144, 146. Namely, the controller 62 may increase the length of the second input arm 122, causing the difference between the pattern diameters 144, 146 to increase; or, the controller 62 may decrease the length of the second input arm 122, causing the difference between the pattern diameters 144, 146 to decrease. In both examples, the median diameter of the pattern (e.g., the average of the minimum and maximum diameters 144, 146) remains constant. In still other embodiments, the controller 62 may be configured to alter the median diameter of the pattern by moving the second input axis 118 relative to frame 46.

Figure 6:
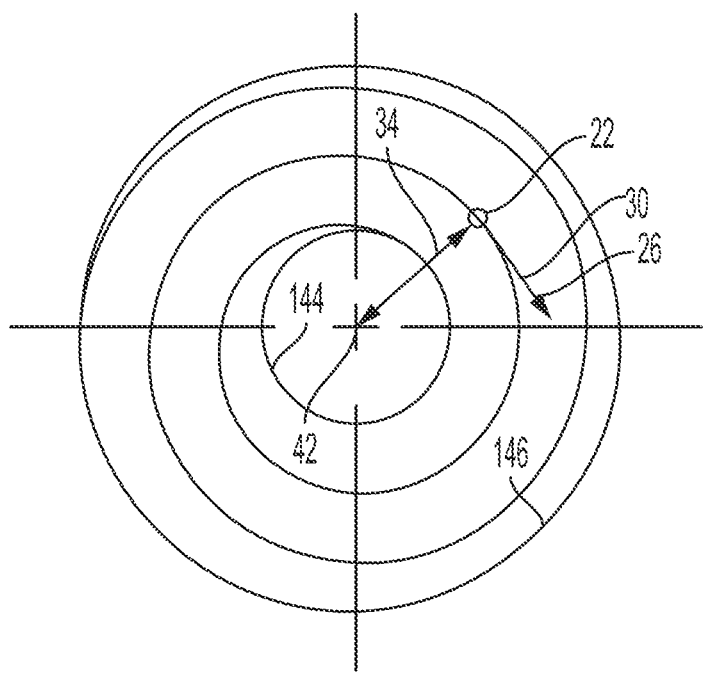
FIG. 6 is a schematic view of a decreasing spiral pattern.

During use in the first operating mode, the simultaneous rotation of the first input motor 78 and the second input motor 114 causes the beam outlet 18 and resulting electromagnetic beam 22 of the emitting device 14 to produce a spiral pattern that alternatingly increases and decreases in diameter between the minimum pattern diameter 144 and the maximum pattern diameter 146 (see FIGS. 5 and 6).

Figure 7:
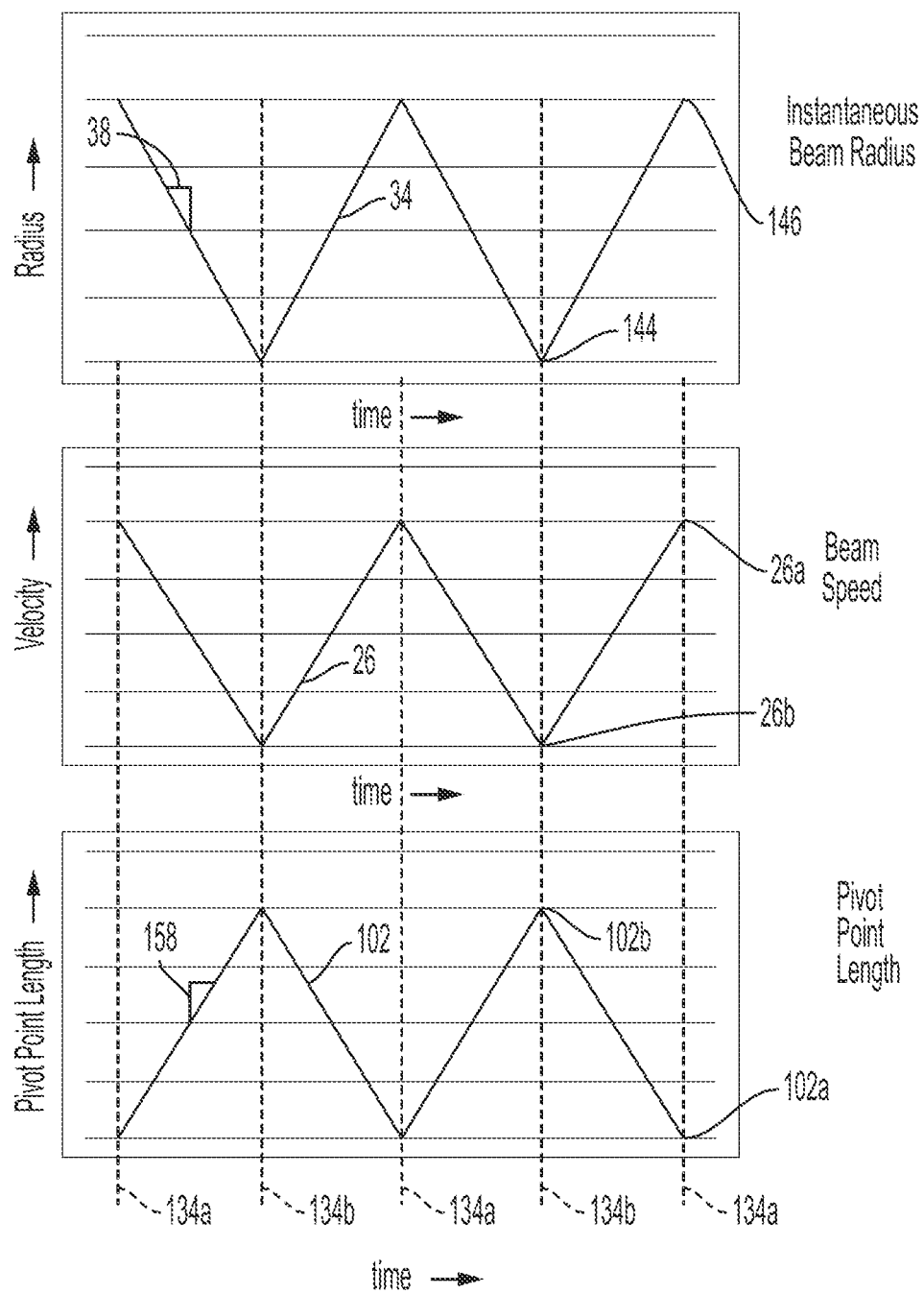
FIG. 7 illustrates various pattern and operational details of the motion generator of FIG. 1.

As shown in FIG. 7, the pivot support 110 begins at the first pivot point location 134*a* producing the first pivot length 102*a* while the first input 54 rotates in a constant first direction at a constant first speed. By doing so, the beam outlet 18 and electromagnetic beam 22 has an instantaneous beam radius 34 equal to the maximum pattern diameter 146, a first maximum beam speed 26*a*, and a first beam direction 30.

As the second input motor 114 rotates, the pivot support 110 travels from the first pivot point location 134*a* and toward the second pivot point location 134*b* at a first support rate of speed 158. By doing so, the pivot length 102 increases causing the mechanical advantage produced by the mount 50 to decrease. This, in turn, causes the instantaneous beam radius 34 and beam speed 26 to steadily decrease while the beam direction 30 remains constant, producing a decreasing radius spiral pattern. The rate at which the beam radius 34 and beam speed 26 decrease is determined by the first support rate of speed 158. The first support rate of speed 158, in turn, is determined by the speed at which second motor 114 rotates.

Once the pivot support 110 reaches the second pivot point 134*b*, the instantaneous beam radius 34 will have become equal to the minimum pattern diameter 144 and the beam speed 26 will have reached a second, minimum value 26*b*. The beam direction 30 remains the same.

Continued rotation of the second input motor 114 then causes the pivot support 110 to travel from the second pivot point location 134*b* to the first pivot point location 134*a* at the first support rate of speed 158. By doing so, the pivot length 102 decreases causing the mechanical advantage produced by the mount 50 to increase. This, in turn, causes the instantaneous beam radius 34 and beam speed to steadily increase while the beam direction 30 remains constant, producing an increasing radius spiral pattern. The rate at which the beam radius 34 and beam speed 26 increase is determined by the first support rate of speed 158. As discussed above, this is determined by the speed at which the second motor 114 rotates.

Once the pivot support 110 returns to the first pivot point 134*a*, the instantaneous beam radius 34 will have returned to the maximum pattern diameter 146 and the beam speed 26 will have returned to the first maximum value 26*a*. The pivot support 110 may then begin reciprocating back toward the second pivot point 134*b* causing the pattern to begin anew.

During use in the second operating mode, the rotation of the first input motor 78 with a stationary second input motor 114 causes the beam outlet 18 and resulting electromagnetic beam 22 to produce a circular pattern at a pre-determined constant beam radius 34.

With the pivot support 110 stationary at a pre-determined pivot point location 134 producing a predetermined pivot length 102, rotation of the first input 54 in a constant first direction at a constant first speed causes the beam outlet 18 and electromagnetic beam 22 to travel in a circular path at the pre-determined beam radius 34, at a pre-determined beam speed 26, and in a pre-determined beam direction 30.

The invention claimed is:

1. A motion generator comprising:
a frame;
a mount movable with respect to the frame;
an emitting device having a beam outlet configured to emit an electromagnetic beam therefrom, and wherein the emitting device is coupled to and movable together with the mount relative to the frame, and
wherein the motion generator is operable in a first mode in which the beam outlet travels in a spiral pattern that alternatingly increases and decreases in radius, wherein for any given point in the spiral pattern the beam outlet produces a beam speed, a beam direction, an instantaneous beam radius, and a beam radius rate of change, and wherein the beam speed, the beam direction, and the beam radius rate of change may be adjusted independently.

2. The motion generator of claim 1, wherein the motion generator is operable in a second mode in which the beam outlet travels in a circular pattern, wherein for any given point in the circular pattern the beam outlet produces a beam speed, a beam direction, and an instantaneous beam radius, and wherein the beam speed, the beam direction, and the instantaneous beam radius may be adjusted independently.

3. The motion generator of claim 1, further comprising a first input extending between and coupled to the mount and the frame and a second input extending between and coupled to the mount and the frame, wherein the first input is configured to establish the beam speed and the beam direction, and wherein the second input is configured to establish the instantaneous beam radius and the beam radius rate of change.

4. The motion generator of claim 3, wherein the first input includes a first input motor defining a first input axis, and a first input arm coupled to the motor for rotation about the first input axis, wherein the first input arm is coupled to a first end of the mount opposite the emitting device.

5. The motion generator of claim 3, wherein the second input includes a pivot support configured to establish a pivot point along the length mount, wherein the pivot support is movable along the length of the mount.

6. The motion generator of claim 5, wherein the second input further comprises a second input motor, and wherein rotation of the second input motor causes the pivot support to travel along the length of the mount.

7. The motion generator of claim 5, wherein moving the pivot support along the length of the mount changes the instantaneous beam radius to change.

8. The motion generator of claim 1, wherein when the motion generator is operating in the first mode the beam outlet travels in a spiral pattern that alternates between a pre-determined maximum radius and a pre-determined minimum radius.

9. A motion generator comprising:
a frame;
a mount movable with respect to the frame, the mount having a first end, a second end opposite the first end, and defining a mount axis extending through the first end and the second end;
an emitting device having a beam outlet configured to emit an electromagnetic beam therefrom, and wherein the emitting device is coupled to and movable together with the first end of the mount;
a first input including a first input arm configured to rotate about a first input axis, wherein the first input arm includes a first mounting point offset from the first input axis, and wherein the second end of the mount is coupled to the first mounting point of the first input arm; and a second input including a pivot support configured to establish a pivot point about which the mount pivots during use, wherein the pivot point defines a pivot point length relative to the second end of the mount, and wherein the pivot support is movable along the mount axis to change the pivot point length.

10. The motion generator of claim 9, wherein the first input includes a first motor defining the first input axis, and wherein operation of the first motor causes the first end of the first input to travel in a circular path centered on the first axis.

11. The motion generator of claim 10, wherein the beam outlet defines a beam speed and a beam direction, and wherein a rotational speed and rotational direction of the first motor at least partially determines the beam speed and the beam direction.

12. The motion generator of claim 9, wherein the second input includes a second motor defining a second input axis, and wherein operation of the second motor causes the pivot point length to change.

13. The motion generator of claim 12, wherein the beam outlet defines a beam radius rate of change, and wherein the rotational speed of the second motor at least partially determines the beam radius rate of change.

14. The motion generator of claim 12, wherein the second input further includes a second input arm coupled to the second motor and a connecting rod extending between and coupled to the pivot support.

15. The motion generator of claim 14, wherein the beam outlet travels in a reciprocating spiral pattern between a maximum beam radius and a minimum beam radius, and wherein the length of the second input arm at least partially defines the difference between the maximum beam radius and the minimum beam radius.

16. The motion generator of claim 9, wherein the pivot support is configured to reciprocate along the mount axis between a first pivot point location at a first pivot point length from the second end of the mount and a second pivot point location at a second pivot point length from the second end of the mount that is different that the first pivot point length.

17. The motion generator of claim 16, wherein the beam outlet travels in a reciprocating spiral pattern between a maximum beam radius and a minimum beam radius, wherein the first pivot point location corresponds with the maximum beam radius, and wherein the second pivot point location corresponds with the minimum beam radius.

18. The motion generator of claim 17, wherein the first pivot point length is less than the second pivot point length.

19. The motion generator of claim 9, wherein the electromagnetic beam is emitted from the beam outlet in a direction parallel to the mount axis.

20. The motion generator of claim 9, wherein the emitting device is a laser.

* * * * *